United States Patent Office 3,354,037
Patented Nov. 21, 1967

3,354,037
17-HALO-Δ$^{16}$-5β-ANDROSTENE-3α-OL-11-ONE
AND 3-ACYL ESTERS THEREOF
Daniel Bertin, Hauts-de-Seine, Montrouge, and Jacques
Perronnet, Paris, France, assignors to Roussel-UCLAF,
Paris, France, a corporation of France
No Drawing. Filed Mar. 8, 1966, Ser. No. 532,563
Claims priority, application France, Mar. 16, 1965,
9,431; June 16, 1965, 21,025
16 Claims. (Cl. 167—65)

ABSTRACT OF THE DISCLOSURE

Novel 17-halo-Δ$^{16}$-5β-androstenes of the formula

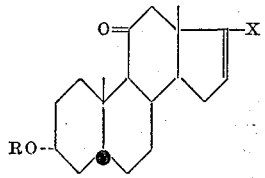

wherein X is a halogen selected from the group consisting of chlorine, bromine and iodine, and R is selected from the group consisting of hydrogen and an acyl radical of an organic carboxylic acid having 1 to 10 carbon atoms, and to a novel process for their preparation and novel intermediates formed therein. The invention also relates to novel tranquilizing compositions and to a method of tranquilizing mammals.

---

The novel 17-halo-Δ$^{16}$-5β-androstenes of Formula I possess useful pharmacodynamic properties and in particular a neurotropic and depressant effect on the central nervous system. Steroid compounds having a neurotropic and depressant effect on the central nervous system are already known, such as the sodium succinate of pregnane-21-ol-3,20-dione, an anesthetic steroid, and 5β-androstane-3α-ol-11-one (described in French Patent No. 1,173,938), which compounds are noteworthy due to their interesting respective neuro-sedative effectiveness. Later on, it was noted that Δ$^{16}$-5β-androstene-3α-ol-11-one (described in Belgian Patent No. 663,949), which is chemically distinguished by the presence of a double bond in the 16,17-position, possesses noticeably superior neuro-sedative activity. However, the 17-halo-Δ$^{16}$-5β-androstenes of Formula I possess an unexpectedly, much more intense activity. 17-chloro-Δ$^{16}$-5β-androstene-3α-ol-11-one and its esters, particularly its 3α-acetoxy ester, are of special interest due to their remarkable tranquilizing activity.

It is an object of the invention to provide the novel 17-halo-Δ$^{16}$-5β-androstenes of Formula I.

It is another object of the invention to provide a novel process for the preparation of the 17-halo-Δ$^{16}$-5β-androstenes of Formula I.

It is a further object of the invention to provide novel intermediates for the 17-halo-Δ$^{16}$-5β-androstenes of Formula I.

It is an additional object of the invention to provide novel tranquilizing compositions.

It is a still further object of the invention to provide a novel method of tranquilizing mammals.

These and other objects and advantages of the invention will become obvious from the following detailed description.

The novel 17-halo-Δ$^{16}$-5β-androstenes of the invention have the formula

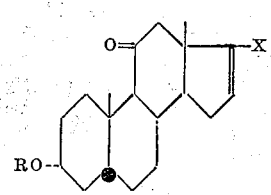

wherein X is a halogen selected from the group consisting of chlorine, bromine and iodine and R is selected from the group consisting of hydrogen and an acyl radical of an organic carboxylic acid having 1 to 10 carbon atoms.

The process of the invention for the preparation of the 17-halo-Δ$^{16}$-5β-androstenes of Formula I comprises reacting 5β-androstane-3α-ol-11,17-dione with hydrazine or a derivative thereof to form 17-hydrazono-5β-androstane-3α-ol-11-one and reacting the latter with a halogenating agent in the presence of a tertiary amine base to form 17-halo-Δ$^{16}$-5β-androstene-3α-ol-11-one wherein the halogen is selected from the group consisting of chlorine, bromine and iodine which can be reacted with an acylating agent of an organic carboxylic acid having 1 to 10 carbon atoms to form the corresponding 3α-acyloxy-17-halo-Δ$^{16}$-5β-androstene-11-one. The reaction scheme is illustrated in Table I:

TABLE I

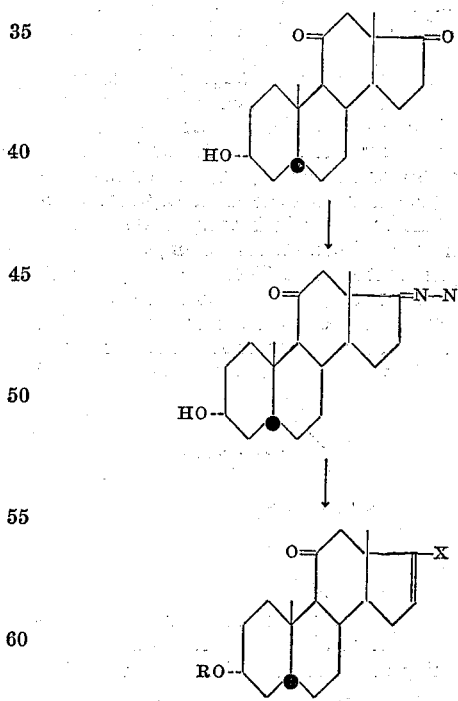

wherein X is a halogen selected from the group consisting of chlorine, bromine and iodine and R is selected from the group consisting of hydrogen and an acyl radical of an organic carboxylic acid of 1 to 10 carbon atoms.

The formation of 17-hydrazono-5β-androstane-3α-ol-11-one may be effected by reacting 5β-androstane-3α-ol-11,17-dione with hydrazine, hydrazine hydrate or an acid salt of hydrazine such as hydrazine hydrochloride.

The halogenation of 17-hydrazono-5β-androstane-3α-ol-11-one can be affected with an N-halo-imide such as N-halo-succinimide wherein the halogen is chlorine, bromine or iodine in the presence of a tertiary amine such as pyridine or with bromine or iodine in the presence of a tertiary amine such as pyridine or triethylamine.

The esterification of 17-halo-Δ16-5β-androstene-3α-ol-11-ones may be effected by reaction of the said compound with the acid halide or acid anhydride of an organic carboxylic acid having 1 to 10 carbon atoms.

A preferred mode of the process of the invention comprises reaction 5β-androstane-3α-ol-11,17-dione with hydrazine hydrate to form 17-hydrazono-5β-androstane-3α-ol-11-one, reacting the latter with an N-halo-succinimide wherein the halogen is selected from the group consisting of chlorine, bromine and iodine to form the corresponding 17-halo-Δ16-5β-androstene-3α-ol-11-one which may be reacted with anhydride of an organic carboxylic acid having 1 to 10 carbon atoms to form the corresponding 3α-acyloxy-17-halo-Δ16-5β-androstene-11-one.

The novel tranquilizing compositions of the invention are comprised of at least one 17-halo-Δ16-5β-androstene of the formula

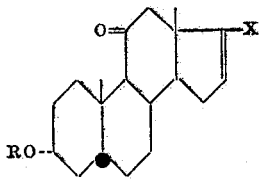

wherein X is a halogen selected from the group consisting of chlorine, bromine and iodine and R is selected from the group consisting of hydrogen and an acyl radical of an organic carboxylic acid having 1 to 10 carbon atoms, and a major amount of a pharmaceutical carrier. The compositions may be in the form of injectable solutions or suspensions, in the form of ampules or multiple dose flacons or in the form of tablets, coated tablets and suppositories prepared in the conventional manner.

The compositions exercise a neurotropic and depressant action on the central nervous system and may be used for the treatment of neurotic conditions and insomnia, of nervous depressions, over-exertion, spasms and in general, of all manifestations or irritability, anguish or nervousness. Moreover, these compositions exert depressant activity on the medulla centers, which brings about muscular relaxation in cases of contractions cramps, muscular aches and stiffness in the limbs. Therefore, they can be utilized as anti-convulsive agents in minor epilepsy.

The novel method of the invention for tranquilizing mammals comprises administering to mammals an effective amount of at least one 17-halo-Δ16-5β-androstene of the formula

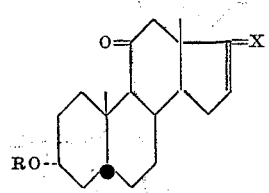

wherein X is a halogen selected from the group consisting of chlorine, bromine and iodine and R is selected from the group consisting of hydrogen and an acyl radical of an organic carboxylic acid having 1 to 10 carbon atoms. The said compounds may be administered orally, transcutaneously or rectally. The usual dosage is between 1.5 mg. and 30 mg. per kilogram per day, depending upon the mode of administration.

In the following examples there are described several preferred embodiments to illustrate the invention. However, it should be understood that the invention is not intended to be limited to the specific embodiments.

EXAMPLE I

Preparation of 17-chloro-Δ16-5β-androstene-3α-ol-11-one

Step B: Preparation of 17-chloro-Δ16-5β-androstene-3α-ol-11-one.—5.2 gm. of 5β-androstane-3α-ol-11,17-dione (described by MINLON et al., J.A.C.S., 76, 2396 (1954)) were introduced into 30 cc. of ethanol and 15 cc. of triethylamine, and then 22.5 cc. of a solution containing 60% of hydrazine hydrate in water were added thereto. The reaction mixture was then heated at reflux and under agitation for 1 hour and 15 minutes, after which the reaction mixture was poured into ice-water and extracted with methylene chloride. The extract was washed with water, dried and evaporated to dryness under vacuum, to obtain 5.4 gm. (a yield of 99%), of 17-hydrazono-5β-androstane-3α-ol-11-one, having a melting point of 210° C. The product obtained was utilized as such for the next step of the preparation.

The product was colorless, and was insoluble in water and soluble in chloroform.

Analysis.—$C_{19}H_{30}N_2O_2$; molecular weight=318.45. Calculated: N, 8.79%. Found: 8.8.

This compound is not described in the literature.

Step B: Preparation of 17-chloro-Δ16-5β-androstene-3α-ol-11-one.—3 gm. of 17-hydrazono-5β-androstane-3α-ol-11-one were dissolved in 60 cc. of anhydrous pyridine and then in complete absence of light, a solution of 4.5 gm. of N-chloro-succinimide in 60 cc. of anhydrous pyridine was added dropwise thereto. A few minutes after the introduction of N-chloro-succinimide, the reaction mixture was poured into ice-water and a few cc. of sodium bisulfite were added thereto. The mixture was then acidified by the addition of hydrochloric acid and was extracted with methylene chloride. The extract was washed with water, dried and evaporated to dryness under vacuum. The residue was dissolved in methylene chloride and then subjected to chromatography through magnesium silicate with elution with methylene chloride containing 0.5% of acetone to obtain the desired product. After recrystallization from cyclohexane, 1.37 gm. of 17-chloro-Δ16-5β-androstene-3α-ol-11-one were obtained, which had a melting point first of 140° C., then of 150° C. and a specific rotation of $[\alpha]_D^{20}$=+76.5°±2° (c.=0.5% in chloroform).

The product occurred in the form of colorless needles, which were insoluble in water, slightly soluble in cyclohexane and soluble in chloroform and ethanol.

Analysis.—$C_{19}H_{27}O_2Cl$; molecular weight=322.87. Calculated: C, 70.67%; H, 8.43%; Cl, 10.98%. Found: C, 71.0%; H, 8.5%; Cl, 11.2%.

Infra-red spectra: Characterized, in addition to the cyclohexanone band and the hydroxyl band, by the presence of a band at 1,595 cm.$^{-1}$.

This compound is not described in the literature.

In an analogous, 17-iodo-Δ16-5β-androstene-3α-ol-11-one, having a melting point of 182° C. and specific rotation of $[\alpha]_D^{20}$=+51°±1.5° (c.=1% in acetone), was prepared. The product was insoluble in water, and soluble in acetone, benzene and chloroform.

This product is not described in the literature.

EXAMPLE II

Preparation of 3α-acetoxy-17-chloro-Δ16-5β-androstene-11-one 165 mg. of 17-chloro-Δ16-5β-androstene-3α-ol-one were introduced into 2 cc. of anhydrous pyridine and after 1 cc. of acetic anhydride was added thereto, the mixture was agitated for 16 hours at room temperature. Then, the reaction mixture was poured into ice-water, was acidified by the addition of N hydrochloric acid and was extracted with methylene chloride. The extract was successively washed with water, with a solution of N hydrochloric acid, then with a saturated solution of sodium bicarbonate and finally again with water, then dried and evaporated to dryness under vacuum. The residue obtained was crystallized from ethanol to obtain 130 mg. of 3α-acetoxy-17-chloro-Δ16-androstene-11-one having a melting point of 137° C.

The product occurred in the form of colorless needles, which were soluble in most of the common organic solvents.

Analysis.—$C_{21}H_{29}O_3Cl$; molecular weight=364.9. Calculated: C, 69.12%; H, 8.01%; C, 9.72%. Found C, 69.0%; H, 8.0%; C, 9.6%.

This compound is not described in the literature.

In an analogous manner, 3α-propionyloxy-17-chloro-Δ16-5β-androstene-11-one, 3α - benzoyloxy-17-chloro-Δ16-5β-androstene-11-one were prepared.

These products are not described in the literature.

*Pharmacological study of 17-chloro-Δ16-5β-androstene-3α-ol-11-one*

(A) *Determination of the sedative effect.*—17-chloro-Δ16-5β-androstene-3α-ol-11-one utilized as an aqueous suspension, was administered by intraperitoneal injection to groups of 10 mice at doses of 10, 20, 50, 100, 200 and 500 mg./kg. A sedative effect on the central nervous system was ascertained, accentuating with increased doses and resulting in a narcotic effect. At doses of 10 and 20 mg./kg. a slight sedative effect was noted, making itself known by hypotony. The effect was more intense and of longer duration at increased doses. The narcotic effect became evident at a dose of 500 mg./kg. when 9 out of 10 mice lost the reflex of straightening during 2 hours at least. At this dose, sleep was calm without preanesthetic agitation, the muscular laxity was marked, and no mortality was observed.

(B) *Determination of the anti-convulsive effect*: convulsions caused by pentamethylenetetrazole.—Groups of 10 female mice were used for this test and the product under study, suspended in a dispersive aqueous liquid, was administered by intraperitoneal injection at doses of 10 and 20 mg./kg., while the control group received only the dispersive liquid. The determination of the anti-convulsive effect was conducted in comparison with 5β-androstane 3α-ol-11-one and Δ16-5β-androstene-3α-ol-11-one. Half an hour after the injection, a solution of 3 mg./cc. of pentamethylene tetrazole in physiological serum was diffused through the mice. The perfusion by intravenous administration was performed at the rate of 1 cc. per minute. During the perfusion, the progress of intoxication was characterized by the following criteria:

(1) Threshold of the convulsive effect (myoclonus (spasms) of the ears).
(2) Crisis of clonic convulsions.

Results are summarized in Table II.

It was established from Table II that the product of the invention, administered by intraperitoneal injection 30 minutes prior to the test, was active starting with the dose of 10 mg./kg. and the protective effect increased gradually in proportion to the doses.

Tests A and B demonstrate that 17-chloro-Δ16-androstene-3α-ol-11-one possesses an extensive range of neuro-sedative effects and that it does not produce any toxicity in mice at the dose of 500 mg./kg.

Various modifications of the compositions and process of the invention may be made without departing from the spirit or scope thereof and it is to be understood that the invention is to be limited only as defined in the appended claims.

We claim:

1. A compound of the formula

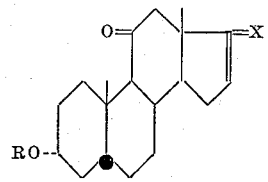

wherein X is a halogen selected from the group consisting of chlorine, bromine and iodine and R is selected from the group consisting of hydrogen and an acyl radical of an organic carboxylic acid having 1 to 10 carbon atoms.

2. A compound of claim 1 wherein X is chlorine.

3. The compound of claim 1 wherein X is chlorine and R is hydrogen.

4. The compound of claim 1 wherein X is chlorine and R is acetoxy.

5. The compound of claim 1 wherein X is chlorine and R is propionyloxy.

6. The compound of claim 1 wherein X is chlorine and R is butyryloxy.

7. The compound of claim 1 wherein X is chlorine and R is benzoyloxy.

8. The compound of claim 1 wherein X is iodine and R is hydrogen.

9. A process for the preparation of 17-halo-Δ16-5β-androstene-3α-ol-11-ones wherein the halogen is selected from the group consisting of chlorine, bromine and iodine, which comprises reacting 5β-androstane-3α-ol-11,17-dione with a compound selected from the group consisting of hydrazine, hydrazine hydrate and an acid salt of hydrazine to form 17-hydrazono-5β-androstane-3α-ol-11-one and reacting the latter with a halogenating agent in the presence of a tertiary amine to form the desired 17-halo-Δ16-5β-androstene-3α-ol-11-one.

10. The process of claim 9 wherein the 17-halo-Δ16-5β-androstene-3α-ol-11-one is reacted with an acylating agent of an organic carboxylic acid having 1 to 10 carbon atoms to form the corresponding 3α-acyloxy-17-halo-Δ16-5β-androstene-11-one.

11. The process of claim 9 wherein 5β-androstane-3α-ol-11,17-dione is reacted with hydrazine hydrate.

TABLE II.—PROTECTIVE EFFECT OF STEROIDS COMPARED WITH CONVULSIONS CAUSED BY PENTAMETHYLENETETRAZOLE

| | Steroid Dose in mg./kg. | Minimum Dose of Convulsive Effect | Percent of Protection | Dose Introducing Clonic Convulsions | Percent of Protection |
|---|---|---|---|---|---|
| 5β-androstane-3α-ol-11-one | 0 | 41 | ---------- | 49 | ---------- |
|  | 20 | 42 | 2 | 57 | 16.3 |
| Δ16-5β-androstene-3α-ol-11-one | 0 | 33 | ---------- | 40 | ---------- |
|  | 10 | 36.1 | 9 | 43.4 | 8.5 |
|  | 20 | 51.5 | 56 | 57.2 | 43 |
| 17-chloro-Δ16-5β-androstene-3α-ol-11-one | 0 | 34.2 | ---------- | 38.6 | ---------- |
|  | 10 | 39.3 | 15 | 47.5 | 23 |
|  | 20 | 53 | 55 | 61.2 | 58.4 |

The doses of pentamethylenetetrazole represent the doses in mg./kg. corresponding with the volumes of diffused solutions.

12. The process of claim 9 wherein the halogenating agent is an N-halo-succinimide wherein the halogen is selected from the group consisting of chlorine, bromine and iodine and the tertiary amine is pyridine.

13. A tranquilizing composition comprised of at least one 17-halo-$\Delta^{16}$-5$\beta$-androstene of the formula

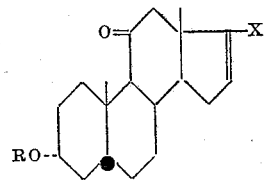

wherein X is a halogen selected from the group consisting of chlorine, bromine and iodine and R is selected from the group consisting of hydrogen and an acyl radical of an organic carboxylic acid having 1 to 10 carbon atoms, and a major amount of a pharmaceutical carrier.

14. A composition of claim 13 wherein the 17-halo-$\Delta^{16}$-5$\beta$ - androstene is 17 - chloro-$\Delta^{16}$-5$\beta$-androstene-3$\alpha$-ol-11-one.

15. A method of tranquilizing mammals which comprises administering to mammals an effective amount of at least one 17-halo-$\Delta^{16}$-5$\beta$-androstene of the formula

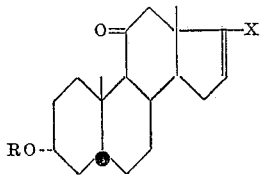

wherein X is a halogen selected from the group consisting of chlorine, bromine and iodine and R is selected from the group consisting of hydrogen and an acyl radical of an organic carboxylic acid having 1 to 10 carbon atoms.

16. The method of claim 15 wherein the 17-halo-$\Delta^{16}$-5$\beta$ - androstene is 17-chloro-$\Delta^{16}$-5$\beta$-androstene-3$\alpha$-ol-11-one.

References Cited

Patchett et al., Journ. Org. Chem., vol. 27 (1962), page 3825 relied on.

ELBERT L. ROBERTS, *Primary Examiner.*

UNITED STATES PATENT OFFICE
CERTIFICATE OF CORRECTION

Patent No. 3,354,037            November 21, 1967

Daniel Bertin et al.

It is hereby certified that error appears in the above numbered patent requiring correction and that the said Letters Patent should read as corrected below.

Column 3, line 10, for "affected" read -- effected --; column 4, line 12, for "Step B: Preparation of 17-chloro- $\Delta^{16}$-5β-androstene-", in italics, read -- Step A: Preparation of 17-hydrazono-5β-androstane- --, in italics; line 63, after "analogous" insert -- manner --; line 73, after "ol-" insert -- 11 --; column 5, line 21, after "one" insert -- and 3α-butyryloxy-17-chloro-$\Delta^{16}$-5β-androstene-11-one --.

Signed and sealed this 17th day of December 1968.

(SEAL)
Attest:

Edward M. Fletcher, Jr.            EDWARD J. BRENNER
Attesting Officer            Commissioner of Patents